J. KESSLER.
Wheel-Cultivator.

No. 61,622.  Patented Jan 29, 1867

Witnesses:

Inventor:
Jacob Kessler
per
Alexander & Mason
Attorneys

United States Patent Office.

JACOB KESSLER, OF YORK COUNTY, PENNSYLVANIA.

Letters Patent No. 61,622, dated January 29, 1867.

IMPROVEMENT IN CULTIVATORS.

The Schedule referred to in these Letters Patent and making part of the same.

TO ALL WHOM IT MAY CONCERN:

Be it known that I, JACOB KESSLER, of York county, State of Pennsylvania, have invented a new and useful Improvement in Cultivators; and do hereby declare that the following is a full, clear, and exact description thereof, reference being had to the accompanying drawings and to the letters of reference marked thereon.

Figure 1:
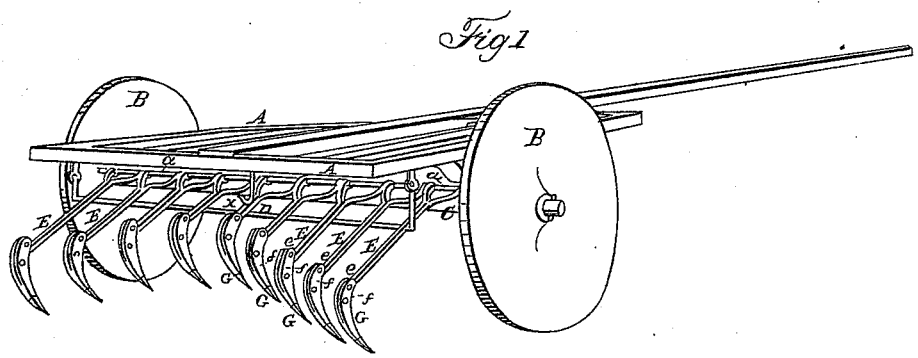
Figure 2:
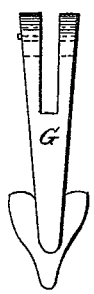
Figure 3:
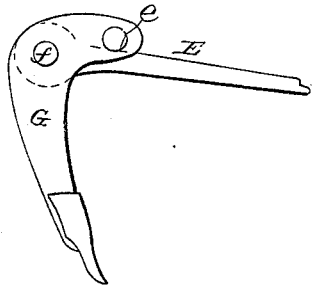
Figure 4:
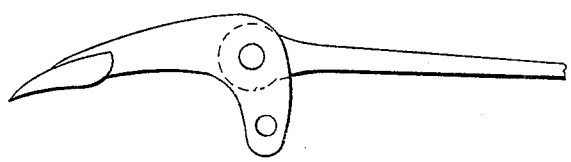

In the annexed drawings, making part of this specification, A represents a rectangular frame made of wood and supported upon an axle C; this axle is supported at each end by the wheels B B. At the back of the axle C, and lying parallel with it, is a metallic rod, $a$, which said rod is secured firmly to the axle. Near the back, and on the under side of the frame A, is hinged a crank-rod D. E E represent a series of draught bars made of metal, and forked at their forward ends. The forked ends of these bars are curved around the rod $a$, and are thus made secure to it. The bars E E pass over the crank-rod D and rest upon it. G G represent a series of cultivator teeth, made in the form shown. These teeth are provided with adjustable points on their lower ends. The upper ends of the teeth G are slotted as seen in Figure 2. The ends of the bars E E pass into the slots in the ends of the teeth G, and are there secured by means of pins or pivots $ff$. $e\ e$ represent pins which pass through the ears of the teeth G, which said ears project forward as shown. The bars E E press against the under side of the pins $e\ e$ when the machine is in operation or moving forward. When the machine moves backward, the pins $e\ e$ move up from the bars and the points of the teeth throw up out of the ground. When it is desired to move the machine from one point to another without allowing the teeth to catch in the ground, the bar or rod D is turned up and confined to the rear of the frame by means of a hook, $x$. This rod when lifted supports the bars E E so as to prevent the teeth from touching the ground.

In operating this machine it matters not whether the horses move forward or back, the machine accommodates itself to the movement, running into the ground when desired in going forward, and drawing out of the ground in moving backward.

Having thus fully described my invention, what I claim as new, and desire to secure by Letters Patents, is—

The arrangement of the teeth G G, as constructed, with the bars E E, rods D and $a$, and the frame of the machine, as and for the purpose specified.

In testimony that I claim the foregoing, I have hereunto set my hand and seal this   day of 186..

JACOB KESSLER.

Witnesses:
ALBERT SMYSER,
JOHN MYERS.